United States Patent [19]
Smith

[11] 3,733,604
[45] May 15, 1973

[54] AIRCRAFT GUIDANCE SYSTEM

[75] Inventor: Harry B. Smith, Catonsville, Md.

[73] Assignee: Westinghouse Electric Corporation, East Pittsburgh, Pa.

[22] Filed: Sept. 11, 1957

[21] Appl. No.: 683,918

[52] U.S. Cl. ............... 343/7 A, 244/3.13, 244/3.19, 343/7 A, 343/7.3, 343/7.4, 343/8, 343/9
[51] Int. Cl. ........................... F41g 7/00, G01s 9/02
[58] Field of Search .................... 343/7.4, 5, 8, 9, 343/7 A, 7.3; 244/14.2, 14.5, 3.13, 3.19; 89/1.5, 1.7, 37.5

[56] References Cited

UNITED STATES PATENTS

| | | | |
|---|---|---|---|
| 2,415,095 | 2/1947 | Varian | 343/13 |
| 2,557,401 | 6/1951 | Agins | 244/14.2 |
| 2,580,560 | 1/1952 | Larsen | 343/7 |
| 2,594,305 | 4/1952 | Haller | 244/14.5 |
| 2,817,832 | 12/1957 | Mathes | 343/13 |

Primary Examiner—Malcolm F. Hubler
Attorney—G. M. Crawford & T. H. Murray

EXEMPLARY CLAIM

6. In an aircraft guidance system in which a guided aircraft is launched and thereafter guided by pulses of radio frequency energy transmitted from a pulse Doppler radar system, the combination of a directional antenna for said pulse Doppler system, means for driving said antenna through a search pattern, means in said pulse Doppler system for tracking a target in range, means in said pulse Doppler system for tracking a target in velocity, a guided aircraft, having a rearward-looking antenna on said guided aircraft for receiving energy transmitted directly from the antenna of said pulse Doppler radar after the guided aircraft is launched and traveling along the beam of energy transmitted by the pulse Doppler antenna, a forward-looking antenna on said guided aircraft for receiving transmitted energy from said pulse Doppler radar which is reflected from said target means in said guided aircraft for deriving an output proportional to the difference in frequencies received by the two antennas on said guided aircraft, a velocity tracking circuit in said aircraft responsive to the output of said deriving means, means responsive to the output of said tracking circuit for varying the angular position of said forward-looking antenna, means connecting the antenna driving means of said pulse Doppler radar to the means for varying the angular position of said guided aircraft forward-looking antenna prior to launch, means connecting the velocity tracking means of said pulse Doppler radar to the velocity tracking means in said guided aircraft prior to launch, and means for increasing the illuminating power of said pulse Doppler radar when the range of said target falls below a predetermined value.

8 Claims, 8 Drawing Figures

Patented May 15, 1973  3,733,604

WITNESSES:
Bernard R. Gieguey
Robert Baird

INVENTOR
Harry B. Smith
BY
ATTORNEY

AIRCRAFT GUIDANCE SYSTEM

This invention relates to a radar aircraft guidance system and more particularly to a semi-active guidance system in which the illuminating power for the guided aircraft is derived from an external source. The invention finds particular, but by no means exclusive, utility when used as a missile guidance system.

In a semi-active missile homing system, radio frequency energy is radiated toward a distant object by a transmitter which is external to the missile itself. This transmitter may, for example, be carried on an interceptor aircraft or on the ground. The transmitted energy is reflected from the distant object and detected by a receiver carried by the missile so that the missile may be automatically directed to the point of reflected energy.

The advantages of such a system are numerous. If the missile had to carry both a transmitter and receiver, its weight and complexity would be considerably increased. By employing an external transmitter carried on an interceptor aircraft or on the ground, greater illuminating powers may be produced and longer missile guidance ranges are possible since a larger transmitter and antenna can be mounted on the interceptor or ground than could be carried on the missile.

Previous semi-active guidance systems have been proposed in which a pulsed radar carried by an interceptor determines the range and angular position of a particular target or object. At the same time, the interceptor generates a CW (constant wave) signal to illuminate a distant object for the CW receiving equipment carried by the missile. As will be understood, both the interceptor and the missile which it carries have a radar antenna, the antenna of the missile usually being slaved to that of the interceptor. When the radar on the interceptor determines the proper time for launching, the missile is set free from the interceptor and is thereafter guided by the CW illumination provided by the interceptor. In the missile the tracking loop consists of a forward antenna and a receiver, which are used to home on the energy reflected from a distant object, and a rearward-looking antenna and receiver for energy received directly from the illuminating CW radar. The rear antenna and receiver are used to synchronize the missile guidance system with the illuminating radar in order that the Doppler shift in frequency caused by movement of a target may be measured in the missile. A velocity gate is generated in the missile which selects only one target having a particular velocity determined by the velocity gate.

Although the system described above is workable, it requires either a pulsed transmitter and a CW transmitter in the interceptor, thus increasing weight and cost, or the use of a CW radar with its inherent problems. In addition, the pulsed radar is ineffective to detect low-flying objects near the surface of the earth. The detection of such low-flying targets is ineffective because of "ground clutter" which arises by virtue of the fact that energy iS not only reflected from a target but also from the ground.

It is an object of this invention to provide a new and improved semi-active aircraft guidance system of the type described above.

More specifically, an object of the invention is to provide a semi-active aircraft guidance system in which a single pulsed Doppler radar system on an interceptor is employed to track a distant object in range, angle and velocity, and also to provide CW illumination for the radar of the guided aircraft. The present invention thus combines the pulsed and CW radars of the prior art into a single pulsed Doppler system.

A still further object of the invention is to provide a semi-active aircraft guidance system which dispenses with the ground clutter problems inherently present in previous guidance systems.

The pulsed Doppler radar system employed in the present invention is fully described in copending applications Ser. No. 570,444 filed Mar. 9, 1956, Ser. No. 592,232 filed June 13, 1956, Ser. No. 592,233 filed June 13, 1956 and Ser. No. 594,661 filed June 28, 1956, all of which are assigned to the assignee of the present application. In the pulsed Doppler radar system described in the foregoing applications, several values of the transmitted pulse repetition frequency are employed which have a common submultiple. Initially, when the radar antenna of the system is searching for a target, the first pulse repetition frequency is used. When a target is detected in the searching process, a tracking time gate is produced which, in effect, is a series of voltage pulses which have the same pulse repetition frequency and phase position as the target returns at this first pulse repetition frequency. The relative position of this gate is stored in a memory circuit by means of a direct current voltage. Then, the frequency of the transmitted pulses is changed to the second pulse repetition frequency and a second tracking gate is produced and its position stored in a memory circuit. If the two tracking gates are passed through a coincidence gate, they will coincide periodically and produce an output pulse. These output pulses are then compared in phase with a series of pulses having a Pulse repetition frequency equal to the difference between the first and second pulse repetition frequencies to produce a direct current output voltage which is proportional to true range.

In a pulsed Doppler radar system of the type described above, a high-duty cycle (i.e., ratio of pulse width to period of time between successive pulses) is desirable for search to achieve maximum range performance for a given expenditure of average power in a given time to periodically examine an angular region or space; whereas, a low-duty cycle is desired for acquisition and track to facilitate measurement of true range and to minimize problems in tracking through ambiguous range intervals between which the received echo may be eclipsed by a transmitted pulse. In order to achieve an acquisition range equal to the detection range and to insure maintenance of lock-on, it is desirable to maintain the same average transmitted power for the two conditions outlined above since this is the criterion determining range performance. Alternatively, the range performance can be shown to be approximately proportional to the ratio of the average value of transmitted power divided by the effective noise bandwidth of the receiver of the system which filters out the desired signal from ground clutter and other spurious signals by making use of the Doppler shift in frequency. Consequently, the narrower the bandwidth, the greater the range performance. During and before acquisition of a target, however, it is desirable to have a relatively wide bandwidth in order to permit a faster buildup of information about a target which may be traveling at any one velocity within a wide range of velocities, so it is altogether desirable and usually necessary to provide filtering apparatus which will shift from a wide bandwidth during the search phase to a narrower bandwidth after detection of the target when tracking commences.

After a target is tracked by the pulsed Doppler radar system in angle, velocity and range, the system is ready to launch the guided missile from the interceptor aircraft. During this phase of operation, the duty cycle of the pulsed Doppler radar must be considerably increased to provide sufficient illuminating power for the CW receiver carried by the missile. Accordingly, in the present invention, the duty cycle of the pulsed Doppler radar carried by the interceptor aircraft is increased after target lock-on to provide increased effective illumination power.

The above and other objects and features of the invention will become apparent from the following detailed description taken in connection with the accompanying drawings which form a part of this specification and in which:

FIG. 5 is an illustration of the output waveform of the various range search and storage circuits illustrated in FIG. 2a.

Figure 1:
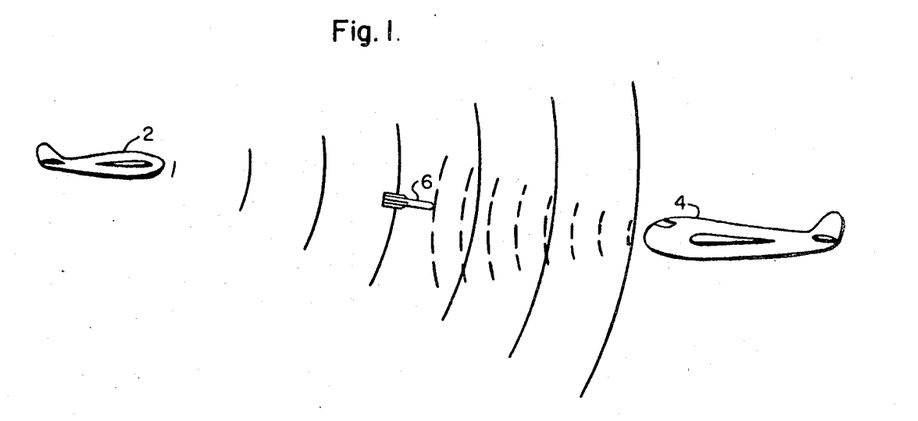
FIG. 1 illustrates an example of the use of a semi-active missile guidance system as applied to an air-to-air scheme.

Referring to FIG. 1, there is shown an interceptor aircraft 2 which radiates CW radar energy indicated by the solid curved lines. This energy is radiated into space and reflected from a distant object, such as another aircraft 4. The reflected energy, shown by the dotted curved lines, is detected by a CW receiver and velocity tracking circuit in a missile 6, the arrangement being such that the missile will automatically track the target 4 and be directed toward the same. From the drawing it is apparent that the illumination for the missile 6 is provided from the external interceptor 2 rather than from a transmitter carried by the missile itself.

DETAILED DESCRIPTION OF PULSED DOPPLER INTERCEPTOR RADAR

Figure 2A:
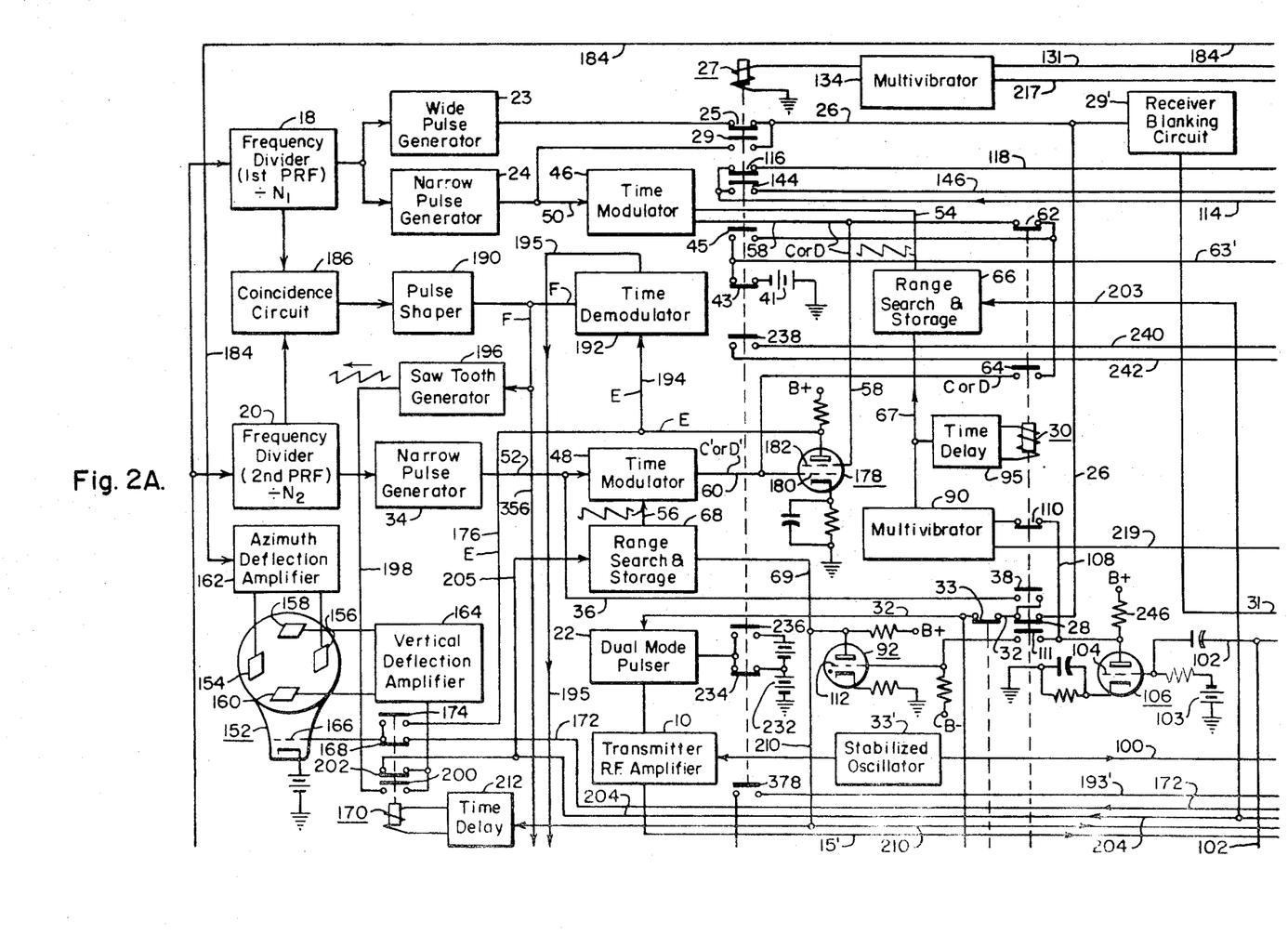
FIGS. 2a and 2b, when placed end to end, FIG. 2c, when placed below FIG. 2a, and FIG. 2d, when placed below FIG. 2b, constitute a schematic diagram of the missile guidance system of the invention.
Figure 2B:
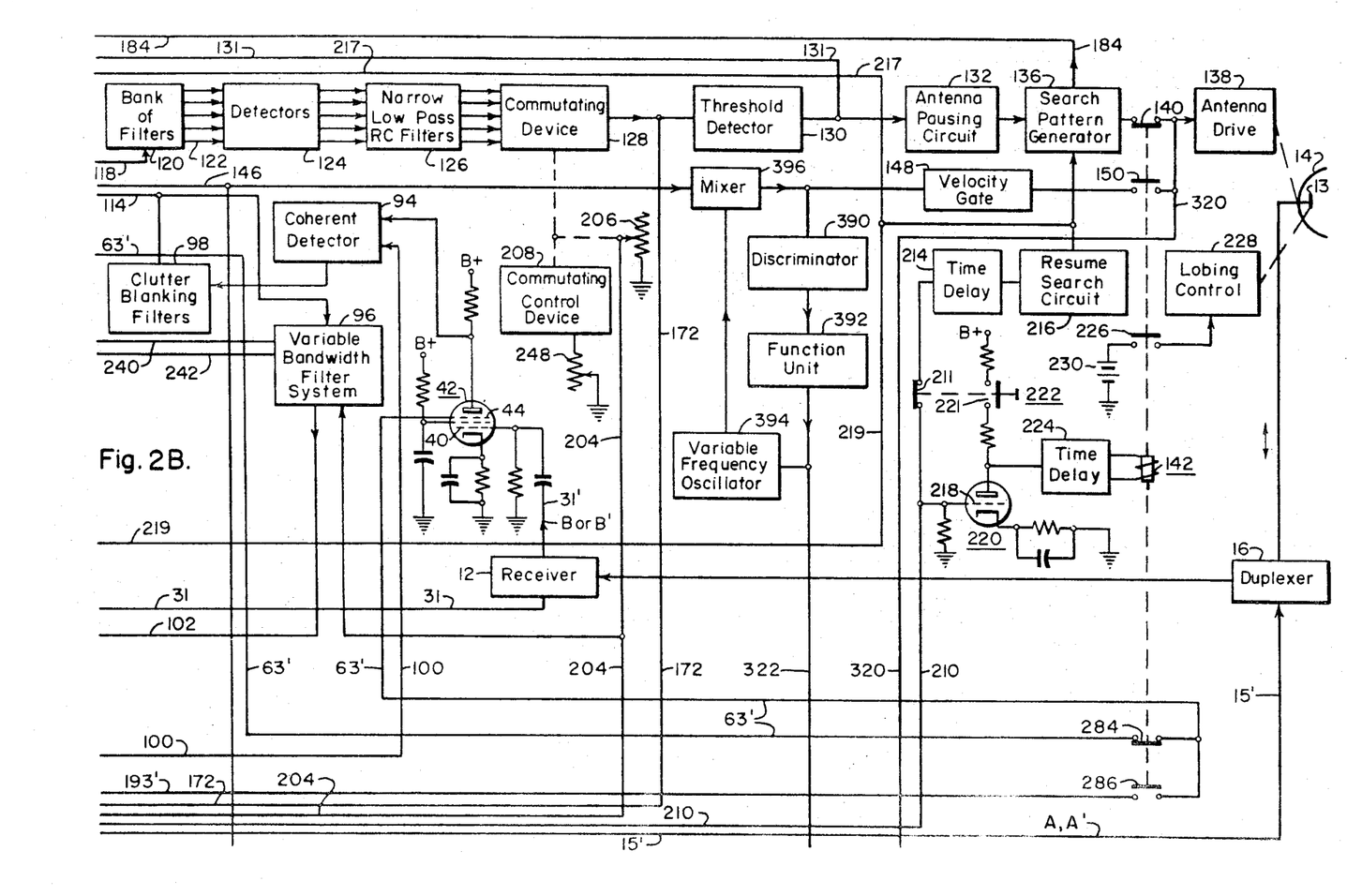
Figure 2C:
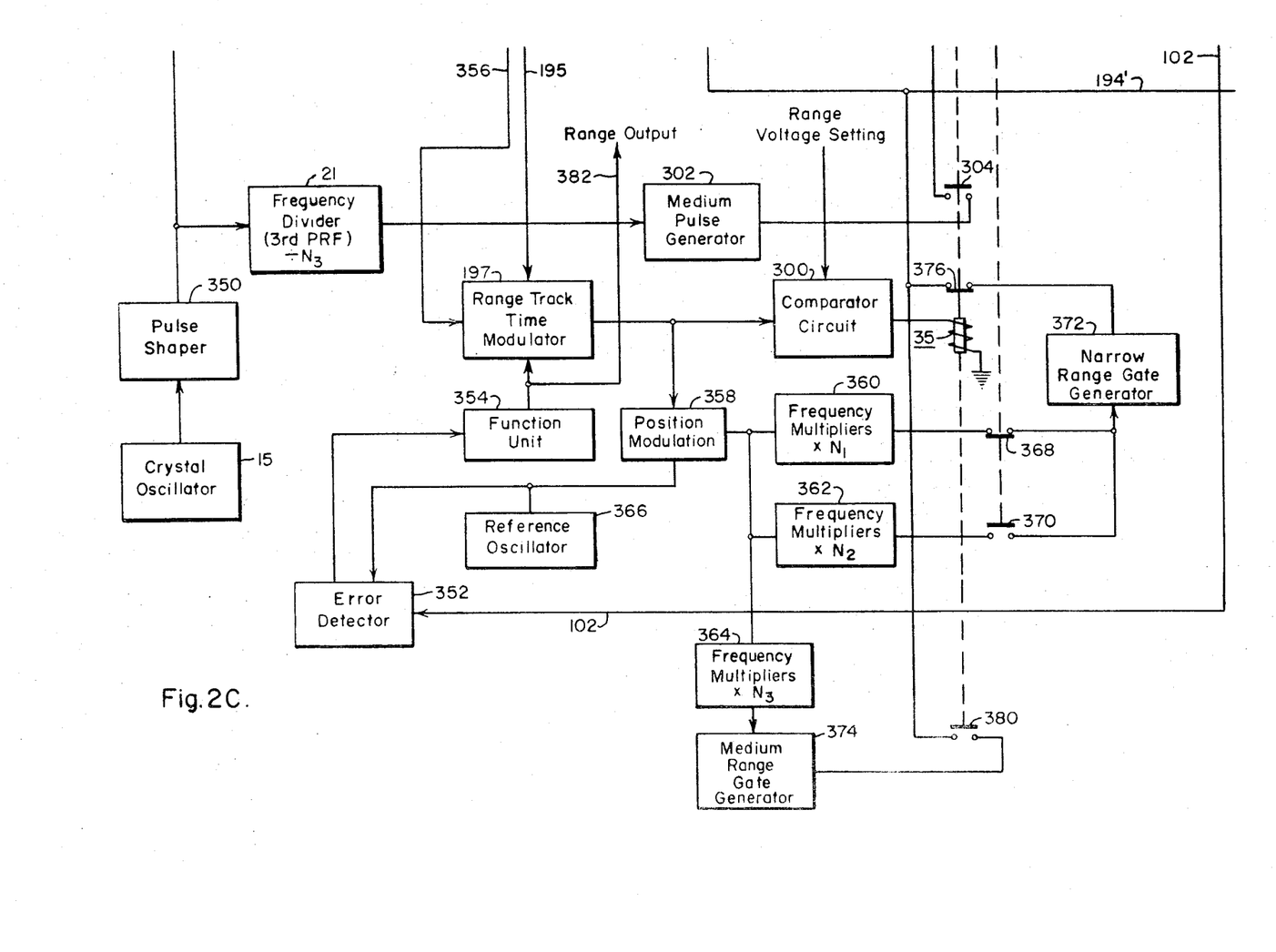

The pulsed Doppler radar system carried on the interceptor 2 and the CW radar receiver of the missile 6 are shown in FIGS. 2a, 2b, 2c and 2d. As shown, the pulsed Doppler radar in FIGS. 2a, 2b and 2c comprises a transmitter 10 and a receiver 12 coupled to a lobing feedhorn 13 of a directional antenna 14 by a suitable fast-acting duplexer 16. A crystal oscillator 15, followed by a pulse shaper 350, shown in FIG. 2c, is provided for initiating pulses of energy which are subsequently radiated from antenna 14. The shaped output of crystal oscillator 15 is divided in frequency dividers 18, 20 and 21, each of which produces a particular value of the pulse repetition frequency. The frequency dividers 18, 20 and 21 are adapted to trigger a multi-pulse width klystron amplifier pulser 22 to generate pulses of radio frequency energy which travel through transmitter 10, lead 15' and duplexer 16 to the antenna 14. The pulse from frequency divider 18 is formed into pulses in one of two pulse generators 23 or 24, generator 23 being adapted to produce a wide output pulse while generator 24 is adapted to produce a narrow output pulse. The output of pulse generator 23 is applied to lead 26 through the normally closed contacts 25 of relay 27; whereas the Output of pulse generator 24 is adapted to be applied to lead 26 through the normally open contacts 29 of relay 27. From lead 26 the pulses from generator 23 or 24, as the case may be, pass through the normally closed contacts 28 of relay 30, lead 32, and the normally closed contacts 33 of relay 35 to pulser 22. Pulses on lead 26 are also applied to a receiver blanking circuit 29' which applies a pulse through lead 31 to receiver 12 to effectivelY disable the receiver during the pulse duration of each pulse from generator 23 or 24. The pulse from pulser 22 is then used to turn on transmitter 10 which constitutes an amplifying device supplied with radio frequency carrier energy from oscillator 33'. Received energy pulses, after amplification in receiver 12, are applied via lead 31' to the control grid 40 of a pentode 42. Under normal conditions, the bias on the suppressor grid 44 of pentode 42 is below cutoff, and the received voltage pulses applied to the control grid will not initiate conduction in the tube. Conduction can be initiated only by the presence of a pulse of sufficient voltage on suppressor grid 44 which will then permit the tube to pass information.

The voltage pulses applied to suppressor grid 44 are supplied from one of two time modulators 46, or 48. As is well known to those skilled in the art, a time modulator comprises a circuit adapted to produce a train of uniformly spaced output pulses having a pulse repetition frequency equal to the repetition frequency of pulses transmitted from the radar system. As shown, pulses of the first repetition frequency are fed from pulse generator 24 to time modulator 46 via lead 50, and those of the other repetition frequency from frequency divider 20 are fed to time modulator 48 through pulse generator 34 via lead 52. The output pulses from the time modulators are positioned in phase with respect to the transmitted energy pulses from the radar system as a function of a direct current control voltage. This control voltage is fed to modulator 46 via lead 54 and to modulator 48 via lead 56. The output pulses from modulators 46 and 48 appear on leads 58 and 60, respectively. Although the functional description of the time modulator given above should suffice for purposes of the present specification, a full and detailed description of various types of time modulators may be found in "Waveforms," Volume 19, MIT Radiation Laboratory Series, by D. Sayer, McGraw-Hill Book Co., Inc., New York, 1949.

Under normal operating conditions, the suppressor grid 44 of pentode 42 is connected to potential source 41 through lead 63', the normally closed contacts 284 of relay 142 and normally closed contacts 43 of relay 27 to enable pentode 42 to amplify during the search phase of operation. However, output pulses from time modulator 46 are adapted to be applied to suppressor grid 44 through the normally closed contacts 62 of relay 30, normally open contacts 45 of relay 27, lead 63' and normally closed contacts 284 of relay 142. Output pulses from time modulator 48 are adapted to be applied to the suppressor grid 44 of pentode 42 through the normaly open contacts 64 of relay 30, the normally open contacts 45 of relay 27, lead 63' and the normally closed contacts 284 of relay 142.

Figure 5:
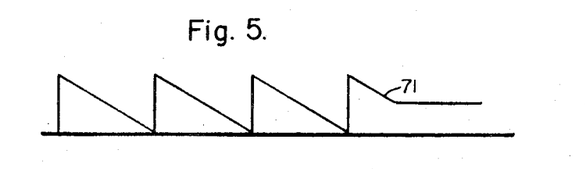

The direct current voltages for time modulators 46 and 48 are supplied from range search and storage circuits 66 and 68, respectively. The output of these circuits is a repetitive, linearly decreasing voltage somewhat like a sawtooth waveform, as shown in FIG. 5. One type of range search and storage circuit which may be used in the present invention is shown and described in copending application Ser. No. 524,016, filed July 25, 1955 and assigned to the assignee of the present application. For purposes of the present description, however, it will be sufficient to state that the range search and storage circuits 66 and 68 will produce output waveforms similar to that shown in FIG. 5 until they receive a signal on lead 67 or 69, respectively, which causes the circuit to stop its linear decrease in voltage at a certain voltage level and maintain that voltage level constant as shown at point 71 in FIG. 5. Alternatively, to accommodate a fast-moving target, the voltage may be made to drift slowly from point 71. The rate of drift will be proportional to target velocity to compensate for a change in range of the target.

In operation, the output of the range search and storage circuits 66 and 68 will be a repetitive linear sawtooth controlling the phase position of the output pulses of time modulators 46 and 48, respectively. Upon detection of a signal signifying coincidence of target returns and the output pulses of time modulator 46 which have the same pulse repetition frequency as the target returns, monostable multivibrator 90 will actuate range search and storage circuit 66 to stop its linear decrease in voltage and hold its output voltage constant at a particular point along its linear fall. This voltage, then, is the one desired to phase the time modulator 46 to correctly position the pulses over the target returns. This resulting phase, represented by the magnitude of the direct current output voltage of circuit 66, now becomes the desired stored information.

As shown in FIG. 2a, the switching device for range search and storage circuit 66 is the multivibrator 90; whereas, the switching device for circuit 68 is a thyratron 92. The thyratron, also being a switching device, serves the same purpose as the multivibrator 90. As shown, multivibrator 90 also controls relay 30 through a time delay device 95.

The radar transmitter 10 sends out pulses of radio frequency energy at a particular frequency. In accordance with well-known Doppler theory, if these pulses of radio frequency energy should strike a stationary object, they will be reflected back to antenna 14 with the same frequency at which they were transmitted, assuming the radar set is stationary. If the radar set is mounted on an aircraft and the transmitted pulses strike a stationary object, they will be received back at the receiver with a shift in frequency proportional to the speed of the aircraft. If the transmitted pulses strike an object with a radial velocity, they will experience a Doppler shift in frequency. It is desirable to separate the target returns from moving targets from those of stationary targets and to pass the moving target returns only to the detection and range tracking portion of the system. To this end, coherent detector 94 and clutter blanking filter system 98 are provided. Essentially, the coherent detector 94 is a mixer which produces an output difference frequency. The target returns are mixed with the output of radio frequency oscillator 33' which is fed to the coherent detector 94 through lead 100. Target returns from stationary targets fall within a rejection filter contained within the clutter blanking filtering system 98. However, target returns from moving targets, having experienced a Doppler shift in frequency, will pass from the coherent detctor 94 and the clutter blanking filter system 98 to the variable filter circuit 96.

The filtering circuit 96 employed is essentially a band pass filter, one possible emboidment of which is shown and described in copending application, Ser. No. 542,820, filed Oct. 26, 1955 and assigned to the assignee of the present application. The functions of the variable filter circuit 96 are to further select a true target return which has experienced a Doppler shift in frequency and to minimize the equivalent noise bandwidth.

The output of variable filter 96 will be a signal of a particular intermediate frequency indicating the existence of a moving target. This signal is applied via lead 102 to the grid 104 of triode 106 which has a suitable source of bias, such as battery 103, applied thereto to prevent passage of noise bursts. The output of the triode is, in turn, applied through lead 108 and the normally closed contacts 110 of relay 30 to multivibrator 90. The pulse from triode 106 is also adapted to be applied through normally open contacts 111 of relay 30 to grid 112 of the thyratron 92 which is normally held cut off by a negative voltage applied to grid 112.

The output of coherent detector 94 is also applied through clutter blanking filtering system 98, lead 114, the normally closed contacts 116 of relay 27 and lead 118 to a bank of contiguous filters 120. Assuming that the radar set is mounted on a moving aircraft and antenna 14 is scanning through a predetermined pattern, the relative motion of the radar beam with respect to the stationary objects will vary periodically as the antenna scans from right through dead center to left, and then back again to its extreme right position. Consequently, clutter blanking filtering system 98, described in copending application Ser. No. 607,541, filed Aug. 29, 1956 and assigned to the assignee of the present application, is provided to compensate for variations in the relative motion of the radar beam so that ground clutter can be filtered from the true target returns. Signals on lead 118 are applied to all of the filters in the bank of filters 120 which consists of a number of like filters progressively covering the band of expected frequencies. Each of these filters has a particular band pass which indicates a particular velocity of a moving target. When one of the filters encompasses a signal on lead 118, it will pass it to one of leads 122, corresponding amplitude detector or rectifier 124, corresponding narrow low pass filter 126, and a commutating device 128 to a threshold detector 130. When a signal is produced on the output lead of threshold detector 130, it will indicate the existence of a moving target. This output is applied via lead 131 to multivibrator 134 which actuates relay 27 to reverse the position of its contacts shown in FIG. 2a. The output of threshold detector 130 is also passed through circuit 132 which causes the antenna search pattern generator 136 to hesitate momentarily. Thus, the antenna drive 138 and antenna 14, connected to and controlled by generator 136 through contacts 140 of relay 142, also hesitate or pause momentarily whenever threshold detector 130 produces an output, indicating the existence of a moving target.

The output of clutter blanking filtering system 98 is also adapted to be applied through lead 114, the normally open contacts 144 of relay 27 and lead 146 to a velocity gate 148 via hetrodyning mixer 396, the output of which is adapted to be applied through normally open contacts 150 of relay 142 so that amplitude modulation produced by antenna lobing can produce an error signal for the antenna drive 138. The velocity track loop consisting of velocity gate 148, frequency discriminator 390, appropriate function unit 392, variable frequency oscillator 394 and mixer 396, well known to those skilled in the art, functions to keep a filter (i.e., velocity gate 148) centered on the target frequency to thereby cause the antenna drive 138 and antenna 14 to automatically track or follow a moving target after it is once detected by threshold detector 130.

Referring now to the lower left-hand corner of FIG. 2a there is shown a CRT display tube 152 having a pair of horizontal or azimuth deflection plates 154 and 156 and a pair of vertical deflection plates 158 and 160. Signals are applied to plates 154 and 156 through deflection amplifier 162; whereas, signals are applied to plates 158 and 160 through deflection amplifier 164. The grid 166 of the CRT tube is connected through the normally closed contacts 168 of relay 170 and lead 172 to the output of commutating device 128. Grid 166 is also adapted to be connected through the normally open contacts 174 of relay 170 and lead 176 to the output of coincidence stage 178 which comprises a vacuum tube having a grid 180 to which the output pulses from time modulator 48 are applied and a grid 182 to which the output pulses from time modulator 46 are applied. Whenever the output pulses from these two time modulators coincide on grids 180 and 182, the coincidence stage 178 will produce an output pulse on lead 176.

The azimuth deflection amplifier 162 receives a signal via lead 184 from search pattern generator 136 which causes the beam of the CRT tube to sweep across the screen of the tube and back again each time the antenna 14 scans through one cycle.

Referring now to frequency dividers 18 and 20, the outputs of these two circuits are applied to a coincidence circuit 186 which produces a pulse having a frequency equal to the difference of the frequencies of the pulse repetition frequencies from dividers 18 and 20. This difference signal is applied through pulse shaper 190 to a time demodulator 192. Output voltage pulses from coincidence stage 178 are applied via a lead 194 to the time demodulator 192. The time demodulator compares the phase of the voltage pulses from coincidence detector 178 with the phase of output pulses from pulse shaper 190 to produce an output voltage on lead 195 which is proportional to the difference in phase between these two signals. This voltage is also proportional to true range and can be used via lead 195 to set the initial conditions in an automatic range tracking loop consisting, primarily, of time modulator 197 which is controlled by current from error detector 352 supplied via an appropriate function unit 354. Time modulator 197 is synchronized by the reference pulse obtained from pulse shaper 190 through lead 356. The output pulses from unit 354 are shifted in phase by the action of the range tracking loop and are supplied to three frequency multipliers 360, 362 and 364, through a time position modulating circuit 358. The time position modulator circuit 358 places a periodic small time displacement on the pulse position by virtue of an AC voltage supplied by reference oscillator 366, and enables a range tracking error signal to be realized from the ultimate output of the receiver 12 on lead 102 by virtue of range gates applied via lead 193' to grid 44 of gated pentode 42 through contacts 286 whenever relay 142 is energized. The output of frequency multiplier 360 occurs at the first prf and is applied through normally closed contacts 368 to narrow gate generator 372. Similarly the output of frequency multiplier 362 is applied to the narrow gate generator via contacts 370 when relay 30 is energized. The output of frequency multiplier 364, which occurs at the third prf is applied to medium range gate generator 374. Output pulses from narrow range gate generator 372 are applied to normally open contacts 378 of relay 27 via normally closed contacts 376 of relay 35. Medium width range gates are supplied to lead 193 through contacts 380 of relay 35 and contacts 378 of relay 27 when both relays are energized.

The range gate supplied on lead 193' are kept positioned over the target return when relay 27 is energized by the action of the error detector 352 which compares the phase and magnitude of the receiver output on lead 102 with the output of the reference oscillator 366.

When the voltage at lead 382 from range track function unit 354 falls below a predetermined value, it will cause a comparator circuit 300 to energize relay 35 and reverse the position of its contacts. Since contacts 33 are now open, lead 32 will no longer be connected to the output of either of the frequency dividers 18 or 20. Rather, lead 32 and dual mode pulser 22 will be connected to the third frequency multiplier 21 and wide pulse shaper 302 through contacts 304 of relay 35. The pulses formed by pulse generator 302 are much wider than those formed by the pulse generator 24, although not as wide as those formed by pulse generator 34 for a purpose which will hereinafter be described.

Output pulses from pulse shaper 190 are also used to trigger a sawtooth wave generator 196, the output of which is adapted to be applied through lead 198 and the normally open contacts 200 of relay 170 to vertical deflection amplifier 164. The vertical deflection amplifier 164, however, is normally controlled by a voltage passing through normally closed contacts 202 of relay 170 and lead 204 which is derived from a variable resistor 206 (FIG. 2b) which is mechanically coupled to the commutating control device 128. This voltage is also used to aid the initial positioning of the variable bandwidth filtering system 96 through lead 201 and as a drift controlling voltage for range search and storage circuits 66 and 68 which are connected to lead 204 through leads 203 and 205, respectively. The variable resistor 206 is, in turn, controlled by a commutating control device 208 which serves to actuate the commutating device 128 to connect each of the leads for the various filters in the bank of filters 120 to threshold detector 130 in rapid succession.

The output of thyratron 92 is also applied through lead 210 to a time delay device 212 which, in turn, actuates relay 170. The thyratron output is also applied through lead 210, contacts 211 of switch 222 and a time delay circuit 214 (FIG. 2b) to a circuit 216 which causes the search pattern generator 136 to resume its normal searching function after the antenna has paused due to the detection of a target to allow range to be measured. The output of circuit 216 is also applied via leads 217 and 219 to multivibrator 134 and 90, respectively, to reverse the states of the multivibrators and deenergize relays 27 and 30, assuming that contacts 211 of switch 222 are closed. Further, the signal from thyratron 92 is applied via lead 210 to the grid 218 of triode 220. Normally, triode 220 is non-conducting by virtue of the fact that contacts 221 of operator-operated switch 222 are open. When switch 222 is closed, the signal from thyratron 92 is applied to grid 218, the triode 220 will produce an output signal which passes through time delay circuit 224 to actuate relay 142. Actuation of relay 142 causes the system to go into track by causing contacts 140 to open and contacts 150 to close. In addition, it causes the normally open contacts 226 to close, thereby connecting a lobing control circuit to a source of voltage, such as battery 230. Whenever contacts 226 close, the lobing control circuit 228 will cause antenna feed horn 13 to move in a lobing pattern.

Supply voltage for the dual mode pulser 22 is supplied from an energy source, such as battery 232. When the contacts of relay 27 are in the position shown, voltage will be supplied to the pulser through normally closed contacts 234; whereas, when the position of the contacts is reversed, substantially more voltage will be supplied to the pulser through contacts 236. Normally open contacts 238 of relay 27 are connected through leads 240 and 242 to variable filter 96. When contacts 238 close, the bandwidth of variable filter 96 is materially reduced.

OPERATION OF PULSE DOPPLER SYSTEM

Figure 3:
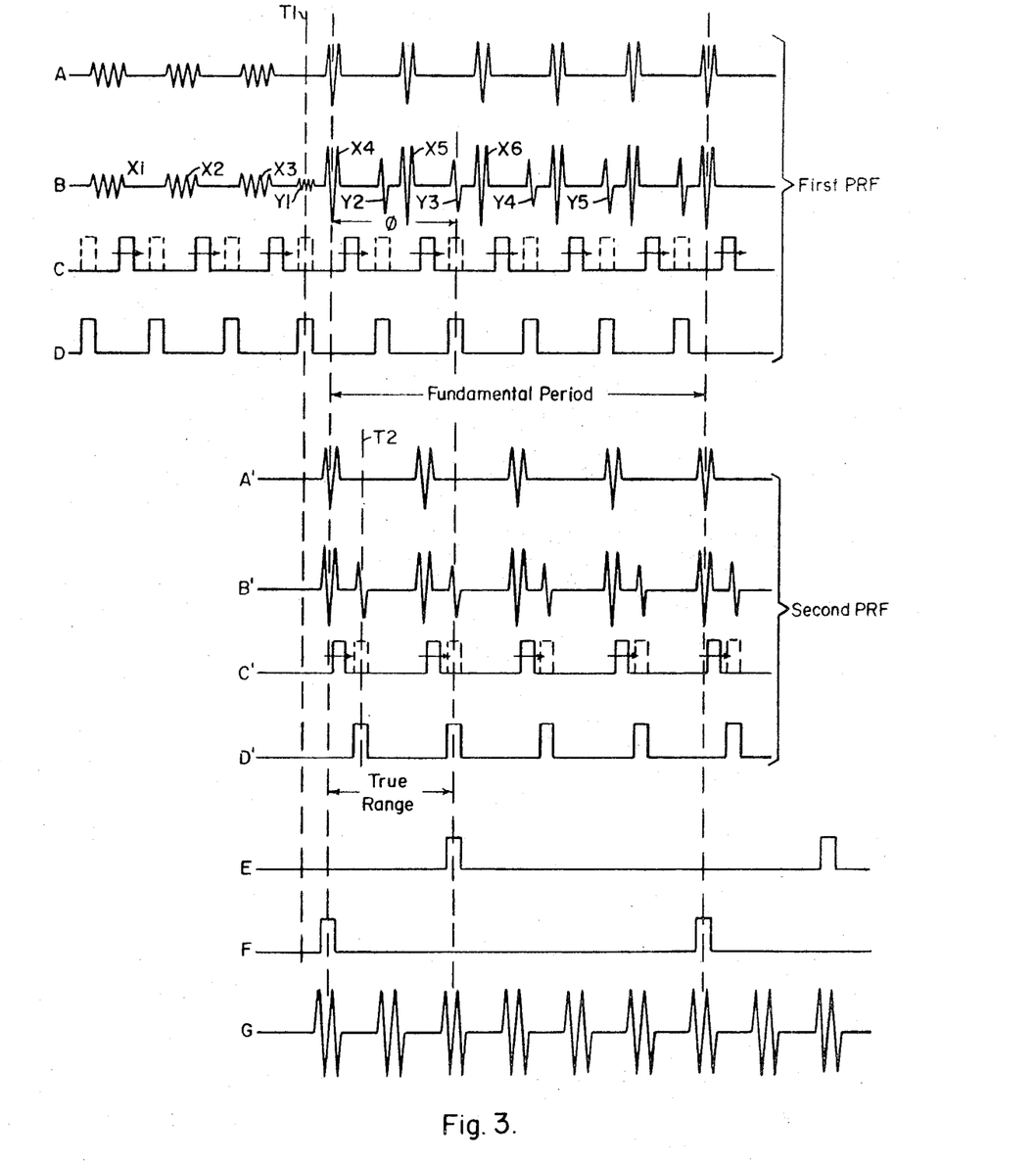
FIG. 3 is an illustration of waveforms appearing at various points in the circuit of FIG. 2.

Operation of the system may best be understood by reference to FIG. 3 which illustrates waveforms appearing at various points in the circuit of FIGS. 2a, 2b and 2c. The waveforms are identified by letters in FIG. 3 and the points at which these waveforms appear in FIG. 2 are indicated by like reference letters.

Under normal operating conditions when the radar system is searching for a moving target, the output of frequency divider 18 is connected to pulser 22 through wide pulse generator 23, normally closed contacts 25 of relay 27, lead 26, normally closed contacts 28 of relay 30, normally closed contacts 33 of relay 35, and lead 32. Antenna 14 will be moved through a scanning pattern at this time by generator 136 and antenna drive 138, and the contacts of all of the relays will be in the positions shown. The signal of the first pulse repetition frequency transmitted from the transmitter 10 appears as waveform A in FIG. 3. It consists of a series of spaced pulses of radio frequency energy of relatively wide pulse width at the first pulse repetition frequency, a value of 100 kilocycles being representative. When the radar beam intercepts a target, the signal from receiver 12 will appear as waveform B. As each pulse is transmitted, a certain amount of radio frequency energy will be reflected to the receiving portion of the antenna 14 and will be detected by the receiver of the system. Receiver blanking circuit 29' effectively disables the receiver 12 during the time of pulse transmission to minimize this receiver leakthrough. However, a small portion of the transmitted energy will be detected by the receiver of the system so that a series of pulses X1, X2, X3, etc., will appear in the wave shape. Reflected energy pulses from a target are indicated pulses Y1, Y2, Y3, etc. The pulse repetition rate of the transmitted pulses is such that two or more pulses will be transmitted from the system before a reflected echo from the target can reach the antenna. This is a result of the high pulse repetition frequency required to facilitate high speed targets; and in this manner the present system differs from a conventional radar system wherein the echo from one transmitted pulse is received by the system before the next subsequent pulse is transmitted. Thus, it is not apparent from an examination of the waveform B whether received pulse Y1, Y2 or Y3 is a reflected pulse of transmitted pulse X1. The pulses Y1, Y2 and Y3 will always be substantially equidistant (neglecting movement of the target) since their corresponding transmitted pulses are equidistant. For purposes of the present explanation, it will be assumed, for example, that Y3 is a reflected pulse of X4. Consequently, the distance $\phi$ indicates true range.

When the antenna is searching or scanning prior to the detection of a target, it is desirable to employ a high-duty cycle or wide pulse width in the transmitted pulses to achieve maximum range performance. Thus, to the left of time T1 indicated in FIG. 3, the transmitted pulses have a relatively wide pulse width. When the first target return Y1 is received by the radar system at time T1, it will be applied via lead 31' to the grid 40 of pentode 42. At this time tube 42 is able to conduct by virtue of voltage supplied to grid 44 from potential source 41 connected through contacts 43 of relay 27 and lead 63' and contacts 284 of relay 142. Assuming the received signal has exPerienced a Doppler shift in frequency, a signal from coherent detector 94 will be applied via clutter blanking filtering system 98, lead 114, normally closed contacts 116 of relay 27, and lead 118 to the bank of filters 120. The signal will pass through one of these filterS, detector 124, low pass filter 126, and commutating device 128 to threshold detector 130. In actual practice, several target returns may be received before the commutating device connects the particular filter through which the signal passes to the threshold detector 130. However, we will assume in this case that the timing of the commutating device 128 is such that the first target return passes through. If the amplitude of the target return is great enough, it will pass through threshold detector 130 and will produce a voltage on lead 131 which triggers multivibrator 134 to deenergize relay 27, thereby causing the contacts of relay 27 to reverse their positions shown in FIG. 2a. Now, the output of the crystal oscillator is applied through narrow pulse generator 24 and contacts 29, rather than wide pulse generator 23, to pulser 22. Thus, at time T1, as shown in FIG. 3, the pulse width of the transmitted pulses is materially decreased to facilitate measurement of true range and to minimize problems in tracking through ambiguous range intervals between which the received echo may be eclipsed by a transmitted pulse.

If the pulse width alone were narrowed, the average power transmitted from the radar system would decrease, since the pulser would be operating during a shorter period as each pulse is transmitted. In order to achieve an acquisition range equal to the detection range and to insure maintenance of lock-on once a target is detected, it is desirable to maintain the same average transmitted power, regardless of the pulse width. Hence, it is desirable to increase the peak power output of the dual mode pulser 22 to effectively increase the amplitude of the transmitted pulses to compensate for their decrease in width. This is done in the present embodiment of the invention by opening contacts 234 and closing contacts 236 when relay 27 is deenergized at time T1 to apply a greater voltage from battery 232 to the pulser 22.

When relay 27 is deenergized, it also closes contacts 238 to thereby narrow the bandwidth of variable filtering system 96. Thus, the effective bandwidth of the filter 96 is relatively wide before a target is detected to permit a faster buildup of target information; whereas, when the target is detected, the bandwidth of the filter is decreased to improve range performance which is proportional to the ratio of transmitted power divided by the bandwidth of the filter.

When threshold detector 130 produces an output, it also triggers circuit 132 to cause the search pattern generator 136 to pause, thereby forcing antenna drive 138 and antenna 14 to pause also. In this way, considerably more information about the target can be fed to the radar system during the pause. The antenna is made to continue searching after a pause by other circuitry, the operation of which will hereinafter be described.

The deenergization of relay 27 upon detection of a target also opens contacts 116 and closes contacts 144. Thus, the output of clutter blanking filter 98 on lead 114 is connected through lead 146 to velocity track circuit 148, which ultimately functions to direct antenna drive 138 to cause antenna 14 to automatically track a target after it is once detected. The output of Velocity gate 148, however, will be ineffective to drive antenna 14 as long as contacts 150 of relay 142 are open, i.e., until the system eventually goes into the tracking condition.

It should be noted that contacts 43 of relay 27 will open and contacts 45 will close upon target detection when relay 27 becomes deenergized. Thus, the output pulses of time modulator 46 are now connected to grid 44 in pentode 42 through normally closed contacts 62 of relay 30, contacts 45 of relay 27, contacts 284 of relay 142 and lead 63'. Pentode 42 will now produce an output pulse only upon coincidence of a pulse from time modulator 46 on grid 44 with a target return on grid 40.

Referring again to coherent detector 94, signals passing through the detector will pass through variable filter 96 and lead 102 to grid 104 of triode 106. Before a target is detected by the system at time T1, multivibrator 90 will permit range search and storage circuit 66 to produce a sawtooth waveform signal similar to that shown in FIG. 5. Hence, range search and storage circuit 66 will supply a recurring sawtooth waveform to time modulator 46. Output pulses from time modulator 46 are applied via contacts 62, contacts 45, contacts 284 and leads 63' to grid 44 of pentode 42. These output pulses appear as waveform C in FIG. 3. The linearly decreasing output voltage from range search and storage circuit 66 causes the output pulses from the time modulator to sweep to the right through the interval between transmitted pulses. When the pulses in waveform C reach the position shown by the dotted lines, one of the pulses will coincide with the target return Y1 at time T1.

When a true target return thus passes through pentode 42 and filtering system 96 at time T1 and is applied to grid 104 of triode 106, the output of the triode will be applied via lead 108 and normally closed contacts 110 to multivibrator 90. The multivibrator 90 is, therefore, switched from one stable state to the other, and it applies a stop-search potential to range search and storage circuit 66. This causes the range search and storage circuit to maintain its output voltage constant, or drift slightly in a manner determined by a voltage proportional to velocity on lead 203, in accordance with the explanation given above. As a result, the output voltage pulses from time modulator 46, which are applied to grid 182 in coincidence detector 178, are maintained in coincidence with the return target signals as shown by waveform D in FIG. 3.

The output from multivibrator 90 also actuates the relay 30 through time delay device 95 to reverse the position of its contacts. Consequently, frequency divider 18 is now disconnected from pulser , and since contacts 28 are now open, and frequency divider 20 is connected to the pulser 22 through pulse generator 34, lead 36, contacts 38, contacts 33, and lead 32. A signal of a second pulse repetition frequency, shown as a waveform A' in FIG. 3, is now transmitted from the system. For illustrative purposes, five pulses at the second pulse repetition frequency are shown transmitted over a time interval during which six pulses at the first pulse repetition frequency were transmitted. Returned echos at the second pulse repetition frequency are now applied to the control grid 40 of pentode 42. However, time modulator 48 is now connected to suppressor grid 44 via contacts 64, contacts 284 and leads 63', and range search and storage circuit 68 is operative by virtue of the fact that the grid 112 of thyratron 92 is connected to a source of negative potential to render it non-conducting. Range search and storage circuit 68 will, therefore, apply a repetitive sawtooth waveform to time modulator 48 which will, in turn, supply a series of output pulses (waveform C') at the second pulse repetition frequency which are periodically swept over a range equal to the distance between successive transmitted pulses. These pulses are applied via contacts 64 and 284 to grid 44 in pentode 42. The output pulses of the time modulator 48 are also applied to grid 180 in coincidence detector 178. When the pulses from modulator 48 on grid 44 coincide with the target returns on grid 40 at the second pulse repetition frequency, the signal which passes through coherent detector 94, variable filter 96, triode 106, and contacts 111 to grid 112 in thyratron 92, initiate conduction in the thyratron, thereby stopping the linear run-down in voltage of range search and storage circuit 68. The range search and storage circuit will hold its output constant at this point, or allows it to drift sloWly in proportion to the velocity voltage supplied via lead 203, and the output of the time modulator 48 will appear as waveform D' in FIG. 3.

The waveforms D and D' are thereupon compared in coincidence detector 178. It can be seen that only the second output pulse of time modulators 46 and 48 coincide. Consequently, coincidence detector 178 will apply an output to the time demodulator 192 at this point, the output pulses in the coincidence detector appearing as waveform E. The difference frequency output of pulse shaper 190 will appear as waveform F in FIG. 3. The demodulator 192 will compare the phase difference between the pulses in waveforms E and F to produce an output voltage indicating true range. This output voltage may then be used to initiate conditions in the range tracking time modulator 197.

Figure 4:
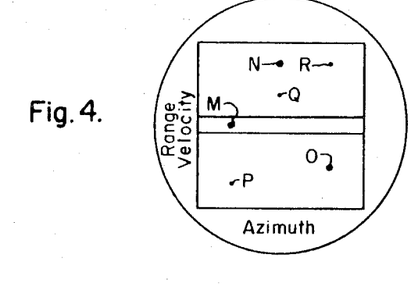
FIG. 4 is an illustration of one type of CRT display that may be used in conjunction with the present invention.

When thyratron 92 is rendered conducting upon the coincidence of a target return in waveform B' with the output pulses from time modulator 48 in waveform C' at time T2, the output signal of thyratron 92 actuates relay 170 through time delay 212. The output of the thyratron applied through lead 210 also actuates the resume search circuit 216 through contacts 211 of switch 222 and time delay 214 which has a greater delay than circuit 212 to cause search pattern generator 136 to resume its operation. Before thyratron 92 fires, the vertical deflection plates 158 and 160 are controlled by the position of commutating control device 208. Thus, the position of the electron stream along the vertical axis of the face of the CRT tube will indicate the velocity of the target, since each position of the contact on resistor 206 indicates that a particular region of the filters in the bank of filters 120 is connected to threshold detector 130, and that a signal passing through the filter of that particular region corresponds to a certain predetermined velocity region. In FIG. 4 the dots produced by the electron stream durinG this time are indicated as M, N and O. The azimuth deflection plates 154 and 156 are controlled through lead 184 by search pattern generator 136. Thus, referring to FIG. 4, when the antenna was left of dead center, a target having a velocity proportional to the distance of dot M from the bottom of the display was detected. When the antenna was at dead center, it detected a target indicated by the dot N having a much higher velocity than that indicated by dot M. When the antenna swung to the right of dead center, it detected a target, the velocity of which is represented by dot O. When thyratron 92 fires, relay 170 becomes energized after a predetermined time delay and contacts 174 and 200 close while contacts 168 and 202 open. Now the grid 166 of the CRT tube is connected to the output of coincidence detector 178; whereas, the vertical deflection plates 158 and 160 are controlled by the sawtooth generator 196 which sweeps the electron beam across the face of the CRT tube during the time interval between successiVe time pulses at the difference frequency between the two pulse repetition frequencies. As will be understood, when pulses from time modulators 48 and 46 coincide on grids 180 and 182 of concidence detector 178, the output of the coincidence detector applied to grid 166 will produce a spot on the face of the CRT tube, the position of which from the bottom of the display is proportional to the range of the particular target. Again the azimuth deflection plates 154 and 156 are connected to search pattern generator 136 so that a target with a velocity indicated by dot M has a range indicated by dot P; a target having a velocity indicated by dot N has the velocity indicated by Q; and a target having a velocity indicated by dot 0 has a range indicated by R. Dots M, N and O can be differentiated from dots P, Q and R by different color, edge lighting or by any other means well known to those skilled in the art.

If the pilot observing the display wishes to track a particular target, he does so by velocity and antenna azimuth selection. That is, he will adjust commutating control device 208 by means of a rheostat 248 or other suitable means so that the commutating device will connect threshold detector 130 to only one of the filters in the bank of filters 120 corresponding to the velocity of the target which he desires to track. The rheostat 248 may be calibrated to correspond to calibrations on the CRT display tube so that a particular target may be bracketed or identified in velocity. At the same time, the pilot will close contacts 222. Now, when the signal from the particular target which the pilot desires to track fires thyratron 92, the output of the thyratron applied through lead 210 to grid 218 of triode 220 will actuate relay 142 through time delay device 224, thereby closing contacts 150 and 226 and opening contacts 140. Relays 27 and 30 remain energized since contacts 211 of switch 222 are open and the output of velocity gate 148 is now connected to the antenna drive 138 to cause the antenna to follow a particular selected target. The feed horn 13 of the antenna 14 is caused to rotate through a lobing pattern by the lobing control 228. In addition, range gates essentially the same as those indicated by waveforms D and D' are supplied from narrow gate generator 372 to the grid 44 of pentode 40 through contacts 286 of energized relay 142. The action of the voltage from time demodulator 192 connected to range track time modulator 197 through lead 193 is such as to cause the range gates supplied from generator 372 to occur at the same time position as those from time modulator 60.

In a system of the type described above, the tracking gate from generator 372 at a particular pulse repetition frequency will track the echo from a moving object until it becomes coincident with a transmitted pulse (i.e., eclipsing starts). Eclipsing is occasioned by the necessity of employing a high repetition frequency which results in a condition wherein, as the target is tracked, the received echo, and hence the tracking gate, occurs during the interval that another pulse is being transmitted. To prevent receiver blocking or other undesirable transient effects, it is desirable to turn the receiver off during each transmitted pulse, but this implies loss of target information during the interval of eclipsing. To cope with the problem of receiver blocking, a method is employed to prevent the transmitted pulse from being eclipsed by a received echo. This method is fully shown and described in copending application Ser. No. 592,223 filed June 13, 1956 and assigned to the assignee of the present application.

As described in the above-mentioned application, eclipsing is sensed by comparison of the synchronizing pulse from one of the pulse generators 23, 24, 34 or 21 used to generate the transmitted pulse of the radar system, and the range tracking gate from range gate generator 372 or 374. When eclipsing occurs, a voltage is developed which controls two operations, namely:

1. It momentarily blanks the receiver 12, and
2. It switches the transmitted pulses of the radar system from one value of the pulse repetition frequency to the other.

Since each of the values of the pulse repetition frequency employed are related by virtue of their derivation from a basic timing source 15, it will be readily apparent that when a target echo is eclipsed by a transmitted pulse at one value of the pulse repetition frequency, it will not simultaneously be eclipsed at another value or values. Furthermore, the true range measuring technique described above has served to position the range tracking gate in range track arrangement consisting of 197, 360, 362, 364, 372 and 374 on the target returns in a manner such that the gate will remain on the target returns regardless of which of the values of the pulse repetition frequency is in use. Thus, when the pulse repetition frequency is switched as a result of an eclipse, the range tracking gate remains on the target returns while the transmitted pulse that was causing eclipsing effectively "moves" to a different position with respect to the target echo to thereby avoid eclipsing without disturbing continuous range tracking of the true echo.

DESCRIPTION OF CW SEEKER

Figure 2D:
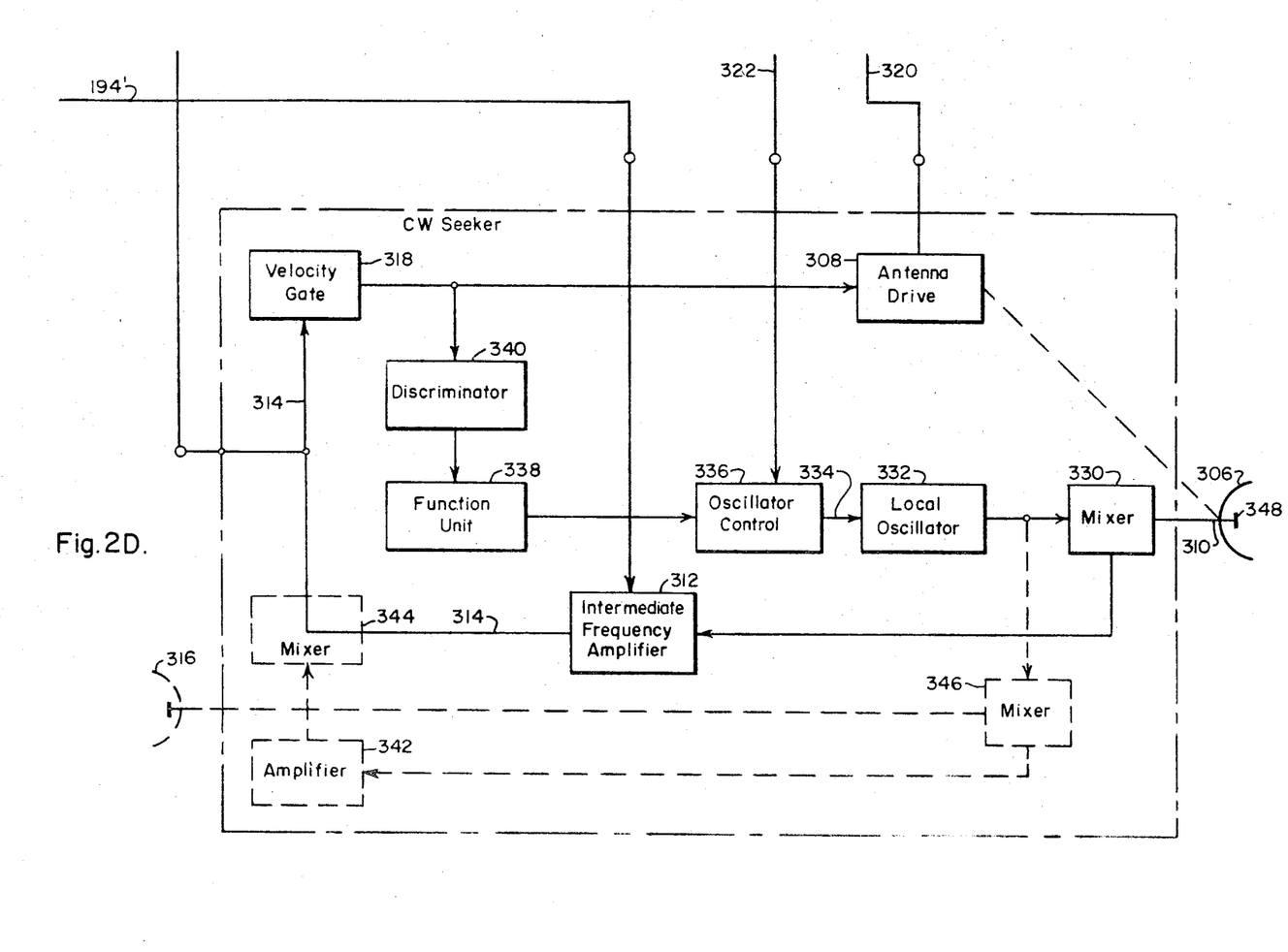

The radar circuitry employed in the CW seeker is shown in FIG. 2d and comprises a conventional forward-looking radar antenna 306 which is driven by an antenna drive mechanism 308. Reflected energy pulses arriving at antenna 306 are directed through lead 310 to a superheterodyne receiver consisting of mixer 330, local oscillator 332 and IF amplifier 312 capable of being turned on by a range gate and operative as a CW amplifier if the range gate is disconnected. The receiving system porduces an output voltage on lead 314 proportional to a Doppler shift in frequency, when the local osicllator is stabilized to the correct frequency by the action of a correcting voltage applied via lead 334 from the oscillator control 336. The Doppler shift in frequency is hetrodyned into the pass band of velocity gate 318 and held within this gate by a velocity tracking loop consisting of frequency (or phase) discriminator 340, appropriate function unit 338 and oscillator control circuit 336 which sets the local oscillator 332 to the proper frequency to keep the signal within velocity gate 318. The tracking loop also serves to stabilize the local oscillator during subsequent flight of the seeker. Oscillator 332 is initially set (prior to launch) to the appropriate frequency by application of velocity information from the parent radar via lead 322 connected to function unit 392 of the parent velocity track loop previously described. As will be understood, the CW seeker, after launching, will be in front of the antenna 14 of the pulse Doppler system so that reflected energy from a distant object will be received by forward-looking antenna 306. Alternatively a signal derived from a rear antenna 316 (shown dotted on 2d) will be used to keep oscillator 332 set to the proper frequency. A signal received via antenna 316 can be used to hetrodyne the signal into velocity gate 318 by means of mixer 344 (shown dotted) after amplification of the rear antenna signal by amplifier 342 and after frequency conversion by mixer 346.

The feed 348 of antenna 306 lobes to produce amplitude modulation of the received signal if there is an angular error. The voltage modulation on lead 314 is fed to the velocity gate 318 which, in turn, furnishes an error signal to antenna drive 308 to follow a particular target which has a particular velocity different from all other targets.

Prior to lauching the CW seeker, the antenna drive 308 in the seeker can be slaved to the output of search pattern generator 136 via lead 320. Thus, antenna 306, before launching, could be commanded to the exact same angular position as antenna 14. In addition, the velocity gate 318 in the CW seeker is slaved to the velocity gate 148 in the pulsed Doppler radar via lead 322. Before launching, the energy received by CW receiver 312 is a series of pulses of radio frequency energy which are spaced in phase from the original transmitted energy pulses from antenna 14 by an amount proportional to the range of the target. By applying the output of medium range gate generator 302 via lead 194' to IF amplifier 312, the target may be tracked in range by the CW seeker simultaneously with angle tracking through antenna drive 308 using the range track system of the parent radar. That is, since a range gate is applied to receiver 312, only those signals from the object being tracked by antenna 14 before launch will pass through the CW receiver 312.

After the target is within range for missile launching, the missile may be launched by a manual control or it may be automatically launched in response to a predetermined value of range voltage obtained from lead 382. In either case, when the missile is launched it will travel as shown in FIG. 1 so that the transmitted energy from antenna 14 is received by antenna 316 in the event this rear horn is employed while that reflected from the distant object is received by antenna 306. The reflected energy from the target passes through the velocity gate 318 and the modulation produced by the lobing antenna feed is supplied to the antenna drive to correct the angular position of antenna 306. Means, not shown, are also provided to automatically direct the missile in accordance with the angular position of antenna 306.

When the range between the interceptor and the target reaches a predetermined value before launching, the comparator circuit 300 will actuate relay 35 in the manner described above so that the output of frequency divider 21 and pulse generator 302 are not applied through dual mode pulser 22 and transmitter 10 to antenna 14. The resulting transmitted signal appears as waveform G in FIG. 3. It will be noted that the width of the transmitted energy pulses is substantially greater than before (although not as great as from the wide pulse generator 23) and that the pulse repetition frequency is increased. In the particular case shown, seven pulses of energy are now transmitted for the five transmitted when the second pulse repetition frequency was employed. Thus, the average illuminating power radiated from the antenna 14 is now materially increased to provide the necessary illumination for the CW seeker. At the same time, the range track circuit will continue to track the target in range since the pulse repetition frequency shown by waveform G is an even multiple of the fundamental frequency.

Thus, the present invention provides a means whereby an object may be tracked in angle, range and velocity before missile launching and may thereafter provide sufficient illuminating power for the CW missile after launch. The system thereby dispenses with the need for a conventional pulsed radar for tracking a target in angle and range and a separate CW transmitter for providing illuminating power for the seeker after launch.

It is, of course, not necessary to actually connect the range gate on lead 194' to the seeker. If this is omitted the seeker sensitivity is reduced by the duty cycle employed in the missile guidance mode (relay 304 energized). It is also to be realized that the range gate connection 194' as well as velocity slaving connection 322 and antenna slaving 320 become disengaged immediately upon launch. Thus, during missile flight the seeker functions as a non-range gated CW seeker with use of the rear antenna optional. It should also be realized that when the seeker has been locked on by the arrangement previously described, the effective bandwidth of its receiving system is determined by the bandwidth of its velocity and angle tracking systems. During actual guidance the effective power available to the seeker from transmitter 10 is simply the average power transmitted by transmitter 10 multiplied by the fractional duty ratio corresponding to the third prf and the medium width pulse generated by generator 302. These values are chosen to give adequate effective illuminating power in the carrier spectral line of the pulse spectrum produced from transmitter 10.

In the event the seeker antenna 306 cannot view the target prior to launch, a signal can be supplied to lead 314 from lead 146 via lead 348 to permit the seeker velocity (and antenna tracking loops) to acquire the target and stabilize the local oscillator 332.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an aircraft guidance system, pulse Doppler radar apparatus for tracking a distant object in range, angle and velocity, a guided aircraft, a rearward-looking antenna on said guided aircraft for receiving energy transmitted directly from said pulse Doppler radar apparatus, a forward-looking antenna on said guided aircraft for receiving reflected energy from said distant object, means in said guided aircraft for deriving an output proportional to the difference in frequencies received by said two antennas, a velocity tracking circuit responsive to said output, means responsive to the output of said velocity tracking circuit for varying the angular position of said forward-looking antenna, and means for changing the duty cycle of said pulse Doppler radar when the range of said distant object falls below a predetermined value.

2. In an aircraft guidance system, pulse Doppler radar apparatus for tracking a distant object in range, angle, and velocity, a guided aircraft, a rearward-looking antenna on said guided aircraft for receiving energy transmitted directly from said pulse Doppler radar apparatus, a forward-looking antenna on said guided aircraft for receiving reflected energy from said distant object, means in said guided aircraft for deriving an output proportional to the difference in frequencies received by said two antennas, and means for changing the duty cycle of said pulse Doppler radar when the range of said distant object falls below a predetermined value.

3. In an aircraft guidance system, pulse Doppler radar apparatus for tracking a distant object in range, angle and velocity, a guided aircraft, energy receiving means on said guided aircraft including means to compare the frequency of energy originally transmitted from said pulse Doppler radar with the frequency of energy reflected from said distant object and to derive an output proportional to the difference between said frequencies, and means in said pulse Doppler radar for increasing the transmitted power radiated thereby when the range of said distant object falls below a predetermined value.

4. In an aircraft guidance system, pulse Doppler radar apparatus employing multiple values of the pulse repetition frequency to track a distant object in range, angle, and velocity, a guided aircraft, a rearward-looking antenna on said guided aircraft for receiving energy transmitted directly from said pulse Doppler radar after the guided aircraft is launched and traveling along the beam of energy transmitted by the pulse Doppler radar, a forward-looking antenna on said guided aircraft for receiving transmitted energy from said pulse Doppler radar which is reflected from said distant object, means in said guided aircraft for deriving an output proportional to the difference in frequencies received by said two antennas, a velocity tracking circuit in said aircraft responsive to the output of said deriving means, means responsive to the output of said tracking circuit for varying the angular position of said forward-looking antenna, means connecting said deriving means in said guided aircraft to said pulse Doppler radar for range gating the deriving means, and means for increasing the illuminating power of said pulse Doppler radar when the range of said distant object falls below a predetermined value.

5. In an aircraft guidance system in which a guided aircraft is launched and thereafter guided by pulses of radio frequency energy transmitted from a pulse Doppler radar system, the combination of a directional antenna for said pulse Doppler system, means for driving said antenna through a search pattern, means in said pulse Doppler system for tracking a target in velocity, means in the pulse Doppler system for tracking a target in range, a guided aircraft, a rearward-looking antenna on the guided aircraft for receiving energy transmitted directly from the antenna of said pulse Doppler radar after the guided aircraft is launched and traveling along the beam of energy transmitted by the pulse Doppler antenna, a forward-looking antenna on said guided aircraft for receiving transmitted energy from said pulse Doppler radar which is reflected from said target, means in said guided aircraft for deriving an output proportional to the difference in frequencies received by the two antennas on said guided aircraft, a velocity tracking circuit in said aircraft responsive to the output of said deriving means, means responsive to the output of said tracking circuit for varying the angular position of said forward-looking antenna, means connecting the antenna driving means of said pulse Doppler radar to the means for varying the angular position of said guided aircraft forward-looking antenna prior to launch, means connecting the velocity tracking means of said pulse Doppler radar to the velocity tracking circuit in said guided aircraft prior to launch, and means connecting the range track means of the pulse Doppler radar to the deriving means of said guided aircraft prior to launch.

6. In an aircraft guidance system in which a guided aircraft is launched and thereafter guided by pulses of radio frequency energy transmitted from a pulse Doppler radar system, the combination of a directional antenna for said pulse Doppler system, means for driving said antenna through a search pattern, means in said pulse Doppler system for tracking a target in range, means in said pulse Doppler system for tracking a target in velocity, a guided aircraft, a rearward-looking antenna or said guided aircraft for receiving energy transmitted directly from the antenna of said pulse Doppler radar after the guided aircraft is launched and traveling along the beam of energy transmitted by the pulse Doppler antenna, a forward-looking antenna on said guided aircraft for receiving transmitted energy from said pulse Doppler radar which is reflected from said target, means in said guided aircraft for deriving an output proportional to the difference in frequencies received by the two antennas on said guided aircraft, a velocity tracking circuit in said aircraft responsive to the output of said deriving means, means responsive to the output of said tracking circuit for varying the angular position of said forward-looking antenna, means connecting the antenna driving means of said pulse Doppler radar to the means for varying the angular position of said guided aircraft forward-looking antenna prior to launch, means connecting the velocity tracking means of said pulse Doppler radar to the velocity tracking means in said guided aircraft prior to launch, and means for increasing the illuminating power of said pulse Doppler radar when the range of said target falls below a predetermined value.

7. In an aircraft guidance system, pulse Doppler radar apparatus including means for tracking a target in velocity, a directional antenna for said pulse Doppler radar apparatus, means for driving said antenna through a search pattern, a guided aircraft adapted for launching from a point adjacent said pulse Doppler apparatus, a directional antenna or said guided aircraft for receiving reflected energy transmitted from said pulse Doppler radar apparatus, a velocity tracking circuit in said guided aircraft, means for driving the antenna of said guided aircraft through a search pattern, means effective prior to launching said aircraft for slaving the means for driving the antenna of said aircraft to the means for driving the antenna of said pulse Doppler radar, and further means effective prior to launching said aircraft for slaving the means for velocity tracking in said pulse Doppler radar to the velocity tracking circuit in said guided aircraft.

8. In an aircraft guidance system, pulse Doppler radar apparatus for locating a distant object in range, angle and velocity, a guided aircraft adapted for launching from a point adjacent said pulse Doppler apparatus, a forward-looking antenna on said guided aircraft for receiving reflected energy transmitted by said pulse Doppler radar apparatus, means for increasing the duty cycle of said pulse Doppler radar apparatus after a distant object is located in range, angle and velocity, a velocity tracking circuit in said guided aircraft, and means responsive to a predetermined range output of said pulse Doppler radar apparatus for providing a signal for launching said guided aircraft.

* * * * *